(12) United States Patent
Tokie

(10) Patent No.: US 11,481,481 B2
(45) Date of Patent: Oct. 25, 2022

(54) INFORMATION PROCESSING APPARATUS, NON-TRANSITORY COMPUTER READABLE MEDIUM STORING PROGRAM, AND INFORMATION PROCESSING SYSTEM

(71) Applicant: FUJIFILM Business Innovation Corp., Tokyo (JP)

(72) Inventor: Katsuji Tokie, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 126 days.

(21) Appl. No.: 16/572,624

(22) Filed: Sep. 17, 2019

(65) Prior Publication Data

US 2020/0097645 A1 Mar. 26, 2020

(30) Foreign Application Priority Data

Sep. 25, 2018 (JP) .............................. JP2018-178630

(51) Int. Cl.
| | | |
|---|---|---|
| *G06F 21/36* | (2013.01) | |
| *G06F 21/62* | (2013.01) | |
| *G06F 16/583* | (2019.01) | |
| *G06F 16/538* | (2019.01) | |
| *G06F 21/45* | (2013.01) | |

(52) U.S. Cl.
CPC ............ *G06F 21/36* (2013.01); *G06F 16/538* (2019.01); *G06F 16/583* (2019.01); *G06F 21/45* (2013.01); *G06F 21/6245* (2013.01)

(58) Field of Classification Search
CPC ...... G06F 21/36; G06F 21/45; G06F 21/6245; G06F 16/583; G06F 16/538
See application file for complete search history.

(56) References Cited

U.S. PATENT DOCUMENTS

| 9,817,997 | B2* | 11/2017 | Patton ................. G06F 21/6245 |
| 10,360,668 | B1* | 7/2019 | McGregor .......... G06K 9/6202 |
| 2004/0093527 | A1* | 5/2004 | Pering .................... G06F 21/36 |
| | | | 726/5 |

(Continued)

FOREIGN PATENT DOCUMENTS

| JP | 2011227573 | 11/2011 |
| JP | 2015055989 | 3/2015 |
| JP | 6021264 | 11/2016 |

OTHER PUBLICATIONS

"Office Action of Japan Counterpart Application", dated Aug. 2, 2022, with English translation thereof, p. 1-p. 6.

(Continued)

*Primary Examiner* — Kristine L Kincaid
*Assistant Examiner* — Alexander R Lapian
(74) *Attorney, Agent, or Firm* — JCIPRNET

(57) ABSTRACT

An information processing apparatus includes a display unit that displays plural images consisting of one or more correct answer images selected from a candidate set, which consists of images not including images corresponding to public information of a user in an image group owned by the user, and one or more incorrect answer images other than the one or more correct answer images, and an image authentication unit that performs authentication of the user by having the user select at least one or more of the correct answer images from the plural displayed images.

23 Claims, 8 Drawing Sheets

(56) References Cited

U.S. PATENT DOCUMENTS

| | | | | |
|---|---|---|---|---|
| 2010/0125911 A1* | 5/2010 | Bhaskaran | ............ | G06Q 10/10 |
| | | | | 726/23 |
| 2010/0229223 A1* | 9/2010 | Shepard | ............... | H04L 63/083 |
| | | | | 726/5 |
| 2010/0325706 A1* | 12/2010 | Hachey | ................... | G06F 21/36 |
| | | | | 726/6 |
| 2012/0128258 A1* | 5/2012 | Wang | ..................... | G06F 21/36 |
| | | | | 382/218 |
| 2015/0193863 A1* | 7/2015 | Cao | ................... | G06Q 30/0643 |
| | | | | 705/27.2 |
| 2016/0217344 A1* | 7/2016 | Misra | ................... | G06K 9/6227 |
| 2017/0132497 A1* | 5/2017 | Santos | ................ | G06K 9/6202 |
| 2017/0300686 A1* | 10/2017 | Shyu | ................. | G06K 9/00604 |
| 2018/0205876 A1* | 7/2018 | Paulus | .............. | H04N 5/23216 |
| 2019/0377854 A1* | 12/2019 | Mehedy | ................ | G06F 3/0488 |
| 2020/0110516 A1* | 4/2020 | Ooba | ................... | G06F 3/0484 |

OTHER PUBLICATIONS

Yusuke Iizawa et al., "Examination of an authentication method for smartphone terminals using user's web page browsing behavior," IPSJ SIG Technical Report, with English translation thereof, Nov. 2017, pp. 1-24.

Yusuke Iizawa et al., "Image based authentication system using Webpage browsing history for smartphone device," IPSJ Symposium, with English translation thereof, Jul. 2018, pp. 1-28.

* cited by examiner

FIG. 2

| IMAGE ID | IMAGE CONTENT TAG | DATE AND TIME TAG | POSITION TAG | APPLICATION TAG |
|---|---|---|---|---|
| A | FOOD, SEA URCHIN BOWL, ⋯ | 08/13/2018 13:14 | (x1, y1, h1) | NUMBER OF STEPS: 2010, ⋯ |
| B | LANDSCAPE, MOUNTAIN, ⋯ | 08/10/2018 10:30 | (x2, y2, h2) | Null |
| ⋮ | ⋮ | ⋮ | ⋮ | ⋮ |

FIG. 8
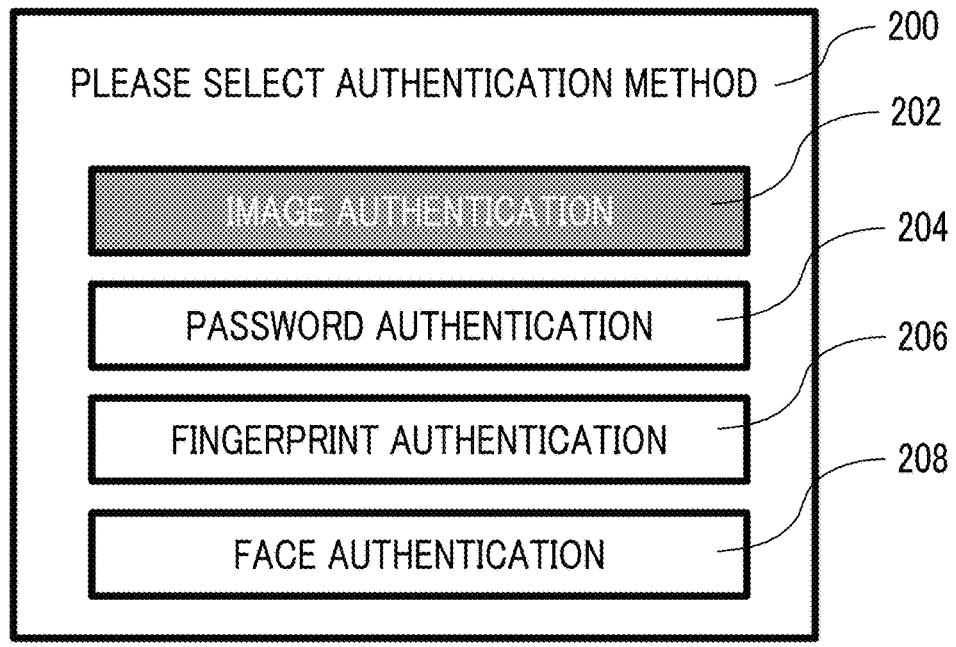
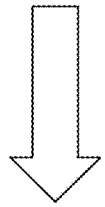
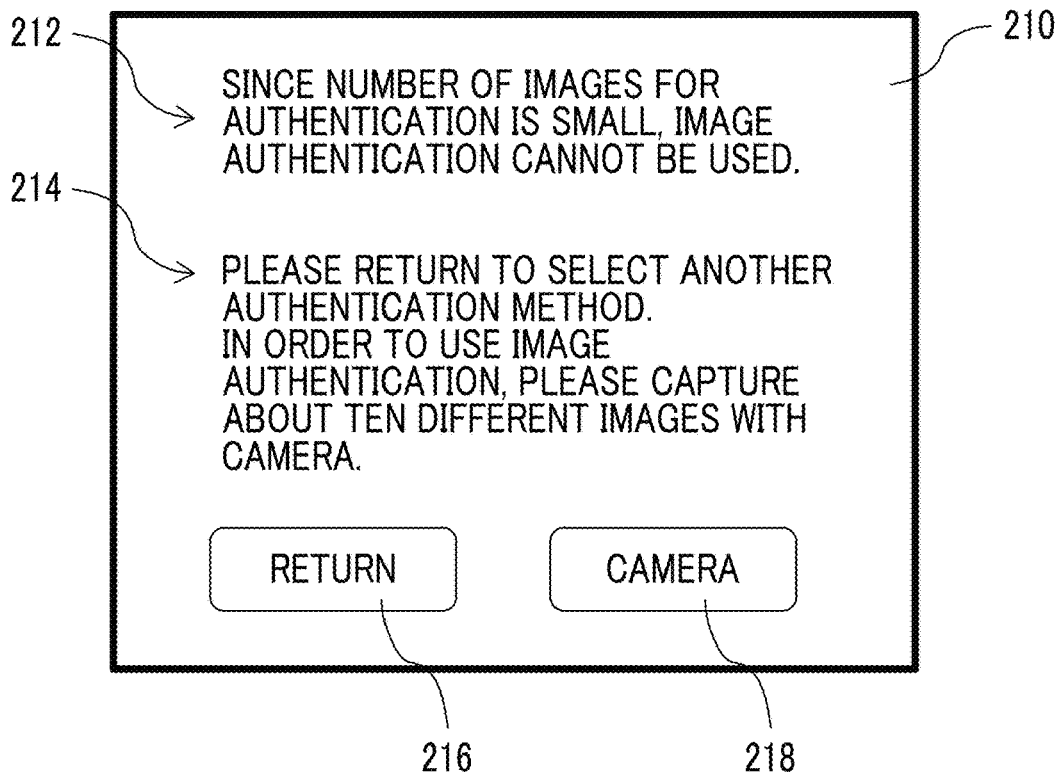

INFORMATION PROCESSING APPARATUS, NON-TRANSITORY COMPUTER READABLE MEDIUM STORING PROGRAM, AND INFORMATION PROCESSING SYSTEM

CROSS-REFERENCE TO RELATED APPLICATIONS

This application is based on and claims priority under 35 USC 119 from Japanese Patent Application No. 2018-178630 filed Sep. 25, 2018.

BACKGROUND

(i) Technical Field

The present invention relates to an information processing apparatus, a non-transitory computer readable medium storing a program, and an information processing system.

(ii) Related Art

Methods of user authentication in an information processing system are largely divided into three types of authentication by memory (knowledge), authentication by possessions, and authentication by personal characteristics. The authentication by memory is a method of causing the knowledge memorized only by the user to be input, and password authentication is a typical example thereof. The authentication by possessions is a method of causing the user to present an apparatus (for example, a smartphone) or a token (for example, an IC card) registered in the system. The authentication by personal characteristics is a method of performing authentication by reading the physical characteristics of a user, such as a fingerprint or a face. Any method has advantages and disadvantages to obtain sufficient performance. For example, since a password with sufficiently high strength is long, the user is likely to forget the password.

In recent years, image authentication is becoming widespread as a method of authentication by memory. The image authentication is a method of performing user authentication by presenting one or more images to the user and causing the user to perform an operation based on the knowledge of the user with respect to the presented image. As a typical example of the image authentication method, one or more correct answer images owned by a user are presented in a state in which these images are mixed with several dummy images (images that are not correct answer images) and the user is caused to select a correct answer image from these images, thereby performing user authentication. An example of a system that performs this kind of authentication is as follows.

In a system disclosed in JP2015-055989A, an image that is uniquely memorized by a user who is an authentication target is registered as personal information in advance, and an image that is not uniquely memorized by the user is displayed as non-personal information together with the personal information. In the case of certifying the user on condition that only the personal information is selected and input from a display screen on which the personal information and the non-personal information are mixed, a plurality of images forming the screen for a predetermined time on the display screen on which the personal information and the non-personal information are mixed are moved within the screen, so that an image can be selected and input only for the time for which the images are moving.

An authentication system disclosed in JP6021264B is a user authentication system that performs user authentication using a plurality of images, and includes an action history storage unit that acquires and stores identification information of a person to be authenticated and an action history (a movement history, a purchase history based on a credit card, a browsing history of a website, and the like) of a person to be authenticated, an authentication image storage unit that acquires and stores an authentication image (a point image, a store image, a product image, a posted image, and the like) corresponding to the action history, an authentication image generation unit that extracts a combination of a plurality of authentication images corresponding to the action history stored in the action history storage unit and displays a plurality of false images different from the authentication images on an authentication screen of a terminal of the person to be authenticated simultaneously with the authentication images, and a user authentication unit that determines whether or not to authenticate the user by receiving a selection of an image displayed on the authentication screen from the terminal of the person to be authenticated.

SUMMARY

Among the images owned by the user, images that can be inferred as images relevant to the user from the public information of the user can be included. In a case where such an image is a correct answer image, the risk that the authentication is broken by a third party cannot be neglected.

Aspects of non-limiting embodiments of the present disclosure relate to an information processing apparatus, a non-transitory computer readable medium storing a program, and an information processing system for providing authentication that is difficult to be broken by a third party compared with a method of authenticating an image, which can be inferred from the public information of a user, as a correct answer image.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: a display unit that displays a plurality of images consisting of one or more correct answer images selected from a candidate set, which consists of images not including images corresponding to public information of a user in an image group owned by the user, and one or more incorrect answer images other than the one or more correct answer images; and an image authentication unit that performs authentication of the user by having the user select at least one or more of the correct answer images from the plurality of displayed images.

BRIEF DESCRIPTION OF THE DRAWINGS

Exemplary embodiment(s) of the present invention will be described in detail based on the following figures, wherein:

FIG. 2 is a diagram illustrating the storage content of an image information storage unit;

FIG. 8 is a diagram showing an example of a guidance screen presented in a case where image authentication cannot be selected from a plurality of authentication methods.

DETAILED DESCRIPTION

Figure 1:
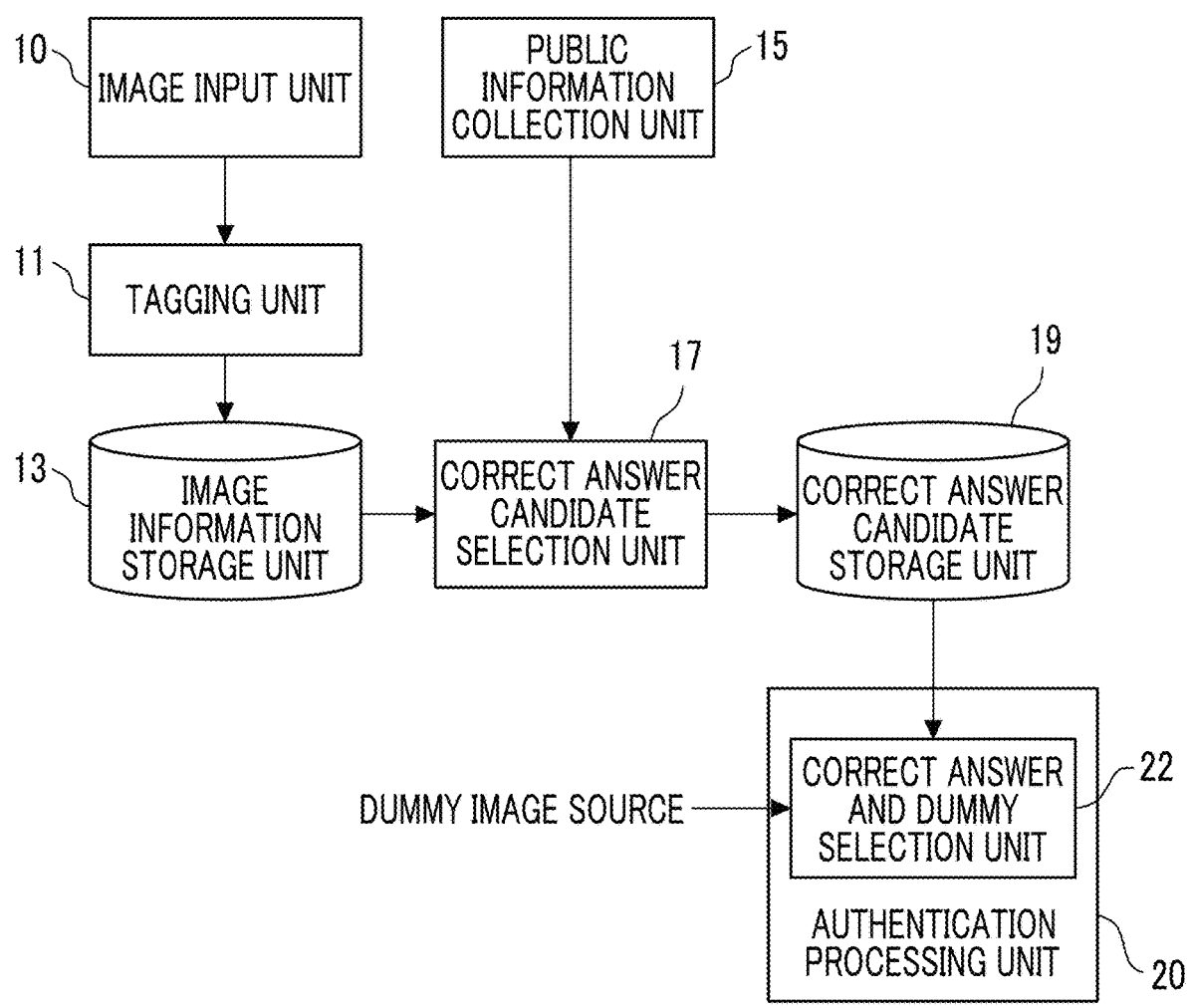
FIG. 1 is a diagram illustrating the functional configuration of an information processing apparatus of an exemplary embodiment.

First, terms used in the present exemplary embodiment will be described.

A "correct answer image" is an image of a correct answer to be selected by a user from a plurality of images presented to the user in image authentication. Among a plurality of images presented in one authentication, two or more correct answer images may be included. In the present exemplary embodiment, the correct answer image is selected from images owned by a user to be authenticated. Here, the "image owned by the user" (hereinafter, also referred to as a "possession image" in the sense of an image possessed by the user) is image data owned by the user. Examples thereof include an image stored in a storage device in a terminal apparatus owned by the user and an image stored in an image storage associated with an account of the user in a server on a network, such as the Internet. For example, in a case where the information processing apparatus that performs user authentication is a mobile terminal (for example, a smartphone) carried by the user, an image group captured by a camera of the mobile terminal and stored in the mobile terminal is a typical example of the "image owned by the user". In this example, an image downloaded from a website or the like to the mobile terminal by the user may also be included in the "image owned by the user (possession image of the user)". Here, the "image group" is a name indicating a set of a plurality of images. In a case where the information processing apparatus that performs user authentication is a server that provides an information processing service to the terminal of the user, an image group registered in the server as candidates for a correct answer image by the user corresponds to the "image owned by the user (that is, an image that the user has in the server)".

A "dummy image" is an image other than a correct answer image included in a plurality of images presented to a user in image authentication. The dummy image may also be referred to as an "incorrect answer image".

As an example, "public information" is information that is open to the public on the network by the user to be authenticated. For example, a profile (self-introduction) that the user has registered in various social networking services (SNS), information (messages, images, videos, links to images and other contents, and the like) posted to the SNS, and information included in the web page open to the public by the user are examples of the "public information". Even information (body, attached file, and the like) transmitted by e-mail by the user may be regarded as public information in a case where predetermined conditions are satisfied, such as a case where the number of destinations is large (for example, a predetermined threshold value or more) or a case where the information is transmitted to addresses other than a predetermined safe destination.

The image authentication of the present exemplary embodiment is based on a method of presenting a plurality of images consisting of one or more correct answer images and one or more dummy images to the user and causing the user to select correct answer images from these images. Here, the correct answer images to be presented to the user are selected from images possessed by the user. Therefore, the user's selection of correct answer images from the presented image group certifies the identity of the user.

However, this mechanism does not hold in a case where a correct answer image is inferred by a person other than the user. Here, it can be thought that the images owned by the user reflect the user's attribute, preference, and the like to some extent. For this reason, the user's attribute, preference, and the like may be inferred from the public information of the user, and a correct answer image may be able to be inferred from a plurality of images at the time of authentication. An image open to the public by the user is clearly an image owned by the user. Therefore, in a case where, for example, an image open to the public on the SNS of the user is included in a plurality of images to be presented at the time of authentication, it can be inferred that there is a high possibility that the image is a correct answer image. In a case where such inference can be made, the safety of user authentication is threatened.

Therefore, in the present exemplary embodiment, among images owned by the user, an image corresponding to the public information of the user, that is, an image that is easily inferred as an image owned by the user from the public information of the user is not selected as a correct answer image. This makes it difficult to infer a correct answer image from the public information of the user. Hereinafter, a mechanism for this will be described in detail.

FIG. 1 shows an example of the functional configuration of an information processing apparatus of the present exemplary embodiment. The information processing apparatus is an apparatus having a function of performing user authentication by image authentication. For example, a terminal apparatus such as a mobile terminal or a personal computer owned by the user is an example of the information processing apparatus of the present exemplary embodiment. In addition, a server that provides an information processing service to the terminal apparatus of the user is another example of the information processing apparatus of the present exemplary embodiment.

An image input unit 10 is means for receiving an input of an image. For example, in a case where the information processing apparatus is a mobile terminal of the user, a camera included in the mobile terminal is an example of the image input unit 10. A function of downloading an image that the mobile terminal has and is located in an external server (for example, s website) is also an example of the image input unit 10. In a case where the information processing apparatus is a server, the image input unit 10 is a function of receiving uploading of an image from the user.

A tagging unit 11 tags the image input to the image input unit 10. A tag is information indicating various attributes of the image. For example, a tag is used as a search key of the image.

The tag attached by the tagging unit 11 is, for example, a tag indicating the content of the image. Examples of the tag indicating the content of the image include a tag indicating the type or name of a major subject in the image and a tag indicating the type (for example, an indoor image or a night view) of situation shown by the image. As a service for attaching a tag indicating the content of an image, Clarifai (https://www.clarifai.com/), Cloud Vision API provided by Google (registered trademark), Computer Vision API provided by Microsoft (registered trademark), and the like are known. For example, the tagging unit 11 tags the input image using one of these external services or a built-in algorithm having the same function as these external services.

The tag attached by the tagging unit 11 may further include a tag indicating an attribute item of attribute information (metadata) of a captured image generated by a camera function as the image input unit 10. For example, the tagging unit 11 may extract items, such as imaging date and time and global positioning system (GPS) information (latitude, longitude, and altitude), in metadata in a photo image file having an exchangeable image file format (exif) as a tag.

In a case where the information processing apparatus of the present exemplary embodiment is a mobile terminal of the user, the tagging unit 11 may attach specific data generated by a specific application (hereinafter, simply referred to as an "application") executed by the mobile terminal, as a tag, to the image input from the image input unit 10. For example, information such as the number of steps, heart rate, type (running, cycling, and the like) of user activity, calorie consumption, and sleeping time generated by the health management application may be attached as a tag.

The tagging unit 11 is not limited to attaching all of various tags exemplified above to images. Alternatively, selection of a tag to be attached to the image among the various tags may be received from the user. For example, the result of the selection may be registered as setting information of the tagging unit 11, and the tagging unit 11 may perform tagging according to the setting information.

An image information storage unit 13 is means for storing an input image and information of a tag attached thereto. FIG. 2 shows an example of data stored in the image information storage unit 13. In this example, for each input image, the image information storage unit 13 stores values of an image content tag attached to the image, a date and time tag (imaging date and time), a position tag (GPS information), an application tag, and the like so as to be associated with the image ID that is identification information of the image. The application tag is tag information generated by a specific application. The image data itself is stored in the information processing apparatus or in a storage region for the user on a server so as to be associated with the image ID, and can be acquired using an image ID.

A public information collection unit 15 collects public information of a user to be authenticated. For example, the public information collection unit 15 acquires public information (for example, a profile, a posted article, and a posted image) open to the public on various kinds of SNS, such as Twitter (registered trademark) and Facebook (registered trademark), or a web page, such as a blog, by the user using an automatic crawling tool (crawler).

Here, the public information collection unit 15 may collect all pieces of information registered in the SNS and the like by the user. However, as another example, the public information collection unit 15 may not collect information whose disclosure range designated by the user is narrower than a predetermined reference range among all the pieces of information. For example, four levels of "open to all", "open to friends of friends", "open only to friends", "not open" can be set as the disclosure range of posted information to the SNS. In a case where the reference range is set to "open to all", the public information collection unit 15 does not collect posted information set to "open to friends of friends", "open only to friends", or "not open". That is, in this example, posted information that can be viewed only by those who belong to a range narrower than the reference range is not regarded as public information. In this manner, only information that may have been viewed by many unspecified persons, among pieces of information that the user has transmitted to the outside through the network, may be handled as public information.

In addition, the public information collection unit 15 collects those satisfying the conditions of public information, among e-mails transmitted by the user, from the e-mail client application or the e-mail server in the information processing apparatus. Here, an example of the "conditions of public information" is conditions that the number of destinations of the e-mail exceeds a predetermined threshold value. Under the conditions, an e-mail transmitted to many destinations is regarded as public information. Another example of the "conditions of public information" is conditions that transmission to destinations other than "safe destination" has been made. As the "safe destination", a destination with less concern of information leakage (for example, a destination such as an e-mail address or a telephone number registered in a destination table in the information processing apparatus of the user himself or herself, a destination to which the user has once responded, a destination corresponding to a person who is a friend on the SNS, and, for example, friends or colleagues) is set in advance by the user. This is an example of defining the confidentiality range registered in association with the user. In a case where all destinations set as destinations of the e-mail are safe destinations or include safe destinations, the information transmitted by the e-mail may not correspond to public information regardless of the number of destinations. In addition, only in a case where there is no safe destination and the number of destinations exceeds a predetermined threshold value, the information transmitted by the e-mail may correspond to public information.

A correct answer candidate selection unit 17 selects an image less relevant to the public information collected by the public information collection unit 15, among the images stored in the image information storage unit 13, as a candidate for a correct answer image (hereinafter, also referred to as a "correct answer candidate"), and stores the selected image in a correct answer candidate storage unit 19. In other words, the correct answer candidate selection unit 17 does not store an image that is easily inferred as an image corresponding to the user from the public information of the user, among the images input by the user through the image input unit 10, in the correct answer candidate storage unit 19. For the selection process performed by the correct answer candidate selection unit 17, a detailed example will be described later.

The correct answer candidate storage unit 19 stores the candidate for a correct answer image selected by the correct answer candidate selection unit 17.

An authentication processing unit 20 performs user authenticating processing by image authentication. For this authenticating processing, a correct answer and dummy selection unit 22 in the authentication processing unit 20 selects one or more correct answer images and one or more dummy images to be presented to the user for image authentication. Here, a correct answer image is selected from the correct answer candidates (an example of a candidate set) stored in the correct answer candidate storage unit 19. In addition, a dummy image is selected from the image group provided from a predetermined dummy image source. The dummy image source may be an image group stored in the information processing apparatus (for example, images in the image information storage unit 13 or images in the correct answer candidate storage unit 19), or may be an image group stored in a server or the like outside the information processing apparatus. For example, in the case of presenting a correct answer image and a dummy image to the user together with a question "Please select an image that you have." (this is an example of "authentication question" presented at the time of authentication), the dummy image needs to be selected from images of the remaining sources excluding the correct answer candidate storage unit 19 and the image information storage unit 13. On the other hand, a case where the image stored in the correct answer candidate storage unit 19 can be used as a dummy image is limited to a case where the user can distinguish between a correct answer image and a dummy image in a question presented together with a plurality of images on the authentication screen (a detailed example will be described later).

The authentication processing unit 20 presents a plurality of images consisting of one or more correct answer images and one or more dummy images selected by the correct answer and dummy selection unit 22 to the user in association with a question that explains which image of the plurality of images is to be selected as a correct answer image, and receives a selection of a correct answer image from the user. In a case where the content of a question is fixed and known to the user, presentation of the question is not indispensable.

Typically, the authentication processing unit 20 presents an authentication screen, on which the plurality of images are displayed side by side within one screen (in a case where there is a question, the question is also displayed), to the user. However, this is merely an example. Instead of this, for example, authentication screens for displaying a plurality of images one by one or by a predetermined number of images may be presented sequentially in time series. In a case where the information processing apparatus of the present exemplary embodiment is a terminal apparatus (for example, a mobile terminal or a PC) of the user, the authentication processing unit 20 displays an authentication screen on a display device attached to the terminal apparatus. In a case where the information processing apparatus is a server, the authentication screen is provided to the terminal apparatus of the user through the network.

Then, the authentication processing unit 20 receives a selection of a correct answer image from the user, and determines success or failure of the authentication based on whether or not the image selected by the user is a correct answer image. In a case where the authentication is successful, the authentication processing unit 20 permits the user to use the information processing apparatus.

Figure 3:
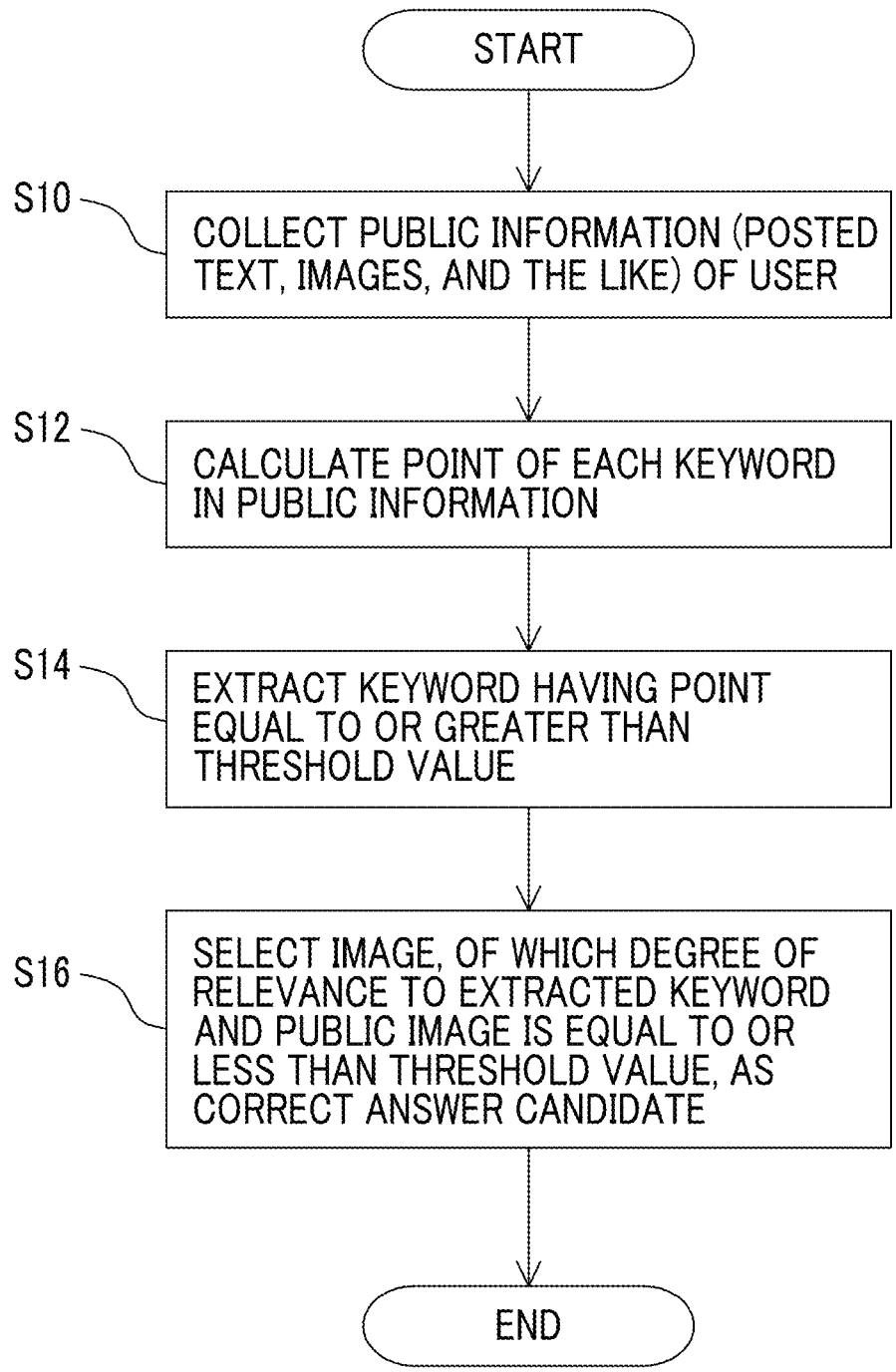
FIG. 3 is a diagram illustrating the procedure of a correct answer candidate selection process.

With reference to FIG. 3, an example of the procedure of the correct answer candidate selection process performed by the public information collection unit 15 and the correct answer candidate selection unit 17 will be described. In a case where the information processing apparatus of the present exemplary embodiment is a server that provides a service to a plurality of users, the public information collection unit 15 and the correct answer candidate selection unit 17 executes the procedure shown in FIG. 3 for each user registered in the server.

In this procedure, the public information collection unit 15 collects public information of the user (S10). The collected public information includes text information or images posted by the user.

Then, the public information collection unit 15 extracts keywords from the collected text public information using a known keyword extraction algorithm, and calculates a point indicating the importance of a keyword for each of the extracted keywords (S12). Here, the keyword includes words that the user treats as a recent trend or words mentioned as tastes and preferences among the words open to the public by the user. The points of each keyword may be calculated by a known algorithm. For example, the point of the keyword has a higher value as the frequency of occurrence of the keyword in public information collected this time becomes higher. In the collected public information, the higher the keyword appears in the vicinity of the word indicating the important attribute of the user, such as "tastes", the higher the point is. The public information collection unit may collect not only keywords but also image information transmitted to the outside through the network. The public information collection unit 15 extracts keywords whose calculated points are equal to or greater than a predetermined threshold value, and transmits the keywords to the correct answer candidate selection unit 17 (S14). In this example, a keyword less relevant to the user (that is, a keyword whose point is less than a threshold value) is not used in selecting a correct answer candidate, thereby, for example, reducing the load of calculation processing for the selection. The public information collection unit 15 transmits the collected keyword or public image of the user to the correct answer candidate selection unit 17.

The correct answer candidate selection unit 17 calculates the degree of relevance between the keyword or the public image received from the public information collection unit 15 and each image stored in the image information storage unit 13. Then, an image whose degree of relevance to the keyword or the public image is equal to or less than a predetermined threshold value is selected as a correct answer candidate and stored in the correct answer candidate storage unit 19 (S16). In other words, an image whose degree of relevance to the keyword or the public image exceeds a predetermined threshold value is considered to be easily inferred as an image relevant to the user from the public information of the user, the image is not selected as a correct answer candidate. In a case where the public information is a public image, the image open to the public is not selected as a correct answer candidate. In order to increase the number of images to be selected as correct answer candidates, it may be considered that, among public images, a public image whose degree of relevance to the keyword collected by the public information collection unit 15 exceeds a predetermined threshold value is not selected as a correct answer candidate.

Here, the degree of relevance of an image with respect to a keyword may be calculated as the degree of relevance between each tag attached to the image and the keyword by using a known algorithm. The degree of relevance of an image with respect to a public image may be calculated as the degree of similarity between the public image and the image, for example. As another example, a public image may be tagged in the same manner as described above, and the degree of relevance between a tag group of the public image and a tag group of an image in the image information storage unit 13 may be calculated by a known algorithm. For example, there is a method in which the tag groups of the two images are regarded as vectors and the degree of cosine similarity between the vectors of both the images is calculated as the degree of relevance.

In one example, the correct answer candidate selection unit 17 does not select an image whose degree of relevance to at least one of the keyword or the public image received from the public information collection unit 15 exceeds a threshold value, among the images in the image information storage unit 13, as a correct answer candidate. Only images whose degrees of relevance to all of these keywords and public images are equal to or less than a threshold value are selected as correct answer candidates.

Figure 4:
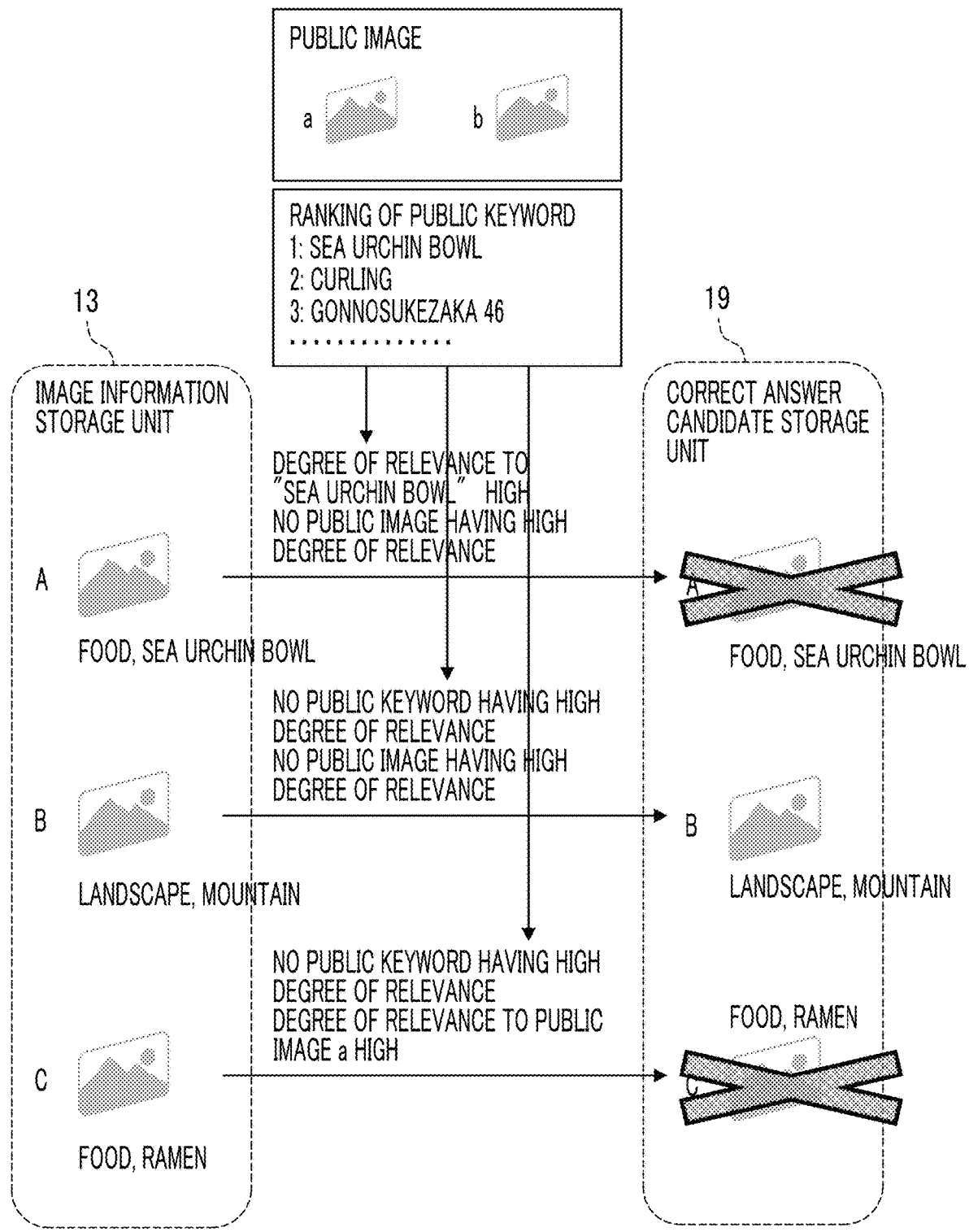
FIG. 4 is a diagram explaining the correct answer candidate selection process using a specific example.

For example, in an example shown in FIG. 4, there are three images A, B, and C as images of the user in the image information storage unit 13, and a tag (food, sea urchin bowl) is attached to the image A, a tag (landscape, mountain) is attached to the image B, and a tag (food, ramen) is attached to the image C. On the other hand, it is assumed that images a and b are open to the public on the SNS and the like by the user and the public information collection unit 15 knows that the keywords included in the public information, such as posts open to the public on the SNS and the like, include "sea urchin bowl", "curling", and the like in the descending order of a point. In this case, the correct answer candidate selection unit 17 excludes the image A, which has a high degree of relevance to "sea urchin bowl" having a high point, from correct answer candidates. In addition, the image C, of which the degree of relevance to the keyword having a high point is not high but which has a high degree of relevance (similarity) to the public image a open to the public by the user, is excluded from the correct answer candidates. Eventually, in this example, only the image B whose degree of relevance to the keyword and the public image having high points is not high is stored in the correct answer candidate storage unit 19 as a correct answer candidate.

As another example, the correct answer candidate selection unit 17 may total the degree of relevance of each image in the image information storage unit 13 with respect to each keyword and each public image received from the public information collection unit 15 and select only an image, of which the total value is equal to or less than a predetermined threshold value, as a correct answer candidate. In the calculation of the total of the degree of relevance, weighting reflecting the point of each keyword may be performed.

The selection process performed by the correct answer candidate selection unit 17 can be said to be a process of specifying a field in which the user is interested from the so-called public information of the user and selecting an image "not" corresponding to the field, among the images in the image information storage unit 13, as a correct answer candidate.

Since the degree of relevance between the correct answer candidate in the correct answer candidate storage unit 19 and the public information open to the public by the user is low, it is difficult to infer from the public information that the correct answer candidate in the correct answer candidate storage unit 19 is a possession image of the user. Therefore, it is difficult for persons other than the user to infer that the correct answer image selected from the correct answer candidates is a possession image of the user, that is, there is a possibility of a correct answer image.

In the example described above, each time an image is input from the image input unit 10, tagging is performed on the image. However, instead of this, tagging may be performed by batch processing on an image group before tagging stored in the information processing apparatus.

Modification Example

Next, a modification example of the above exemplary embodiment will be described.

An authentication method of causing the user to simply select an image (correct answer image) owned by the user from a plurality of images presented to the user fails in a case where the user forgets that the image is an image owned by the user himself or herself.

On the other hand, the tag attached to the correct answer image candidate in the correct answer candidate storage unit 19 includes the image content of the correct answer image candidate or information regarding the situation at the time of image acquisition (imaging date and time, GPS information, information generated by the application at the time of acquisition, and the like). The tag information, in particular, the information regarding the situation at the time of image acquisition, is information that only the user can know. In addition, the tag information often remains in the user's memory. Accordingly, by presenting the tag information in association with the image, it is expected that the tag information will help the user select the correct answer image with high confidence.

In this modification example, therefore, a question generated using tag information is used as a question for authentication to be presented to the user in association with a plurality of images at the time of authentication.

Figure 5:
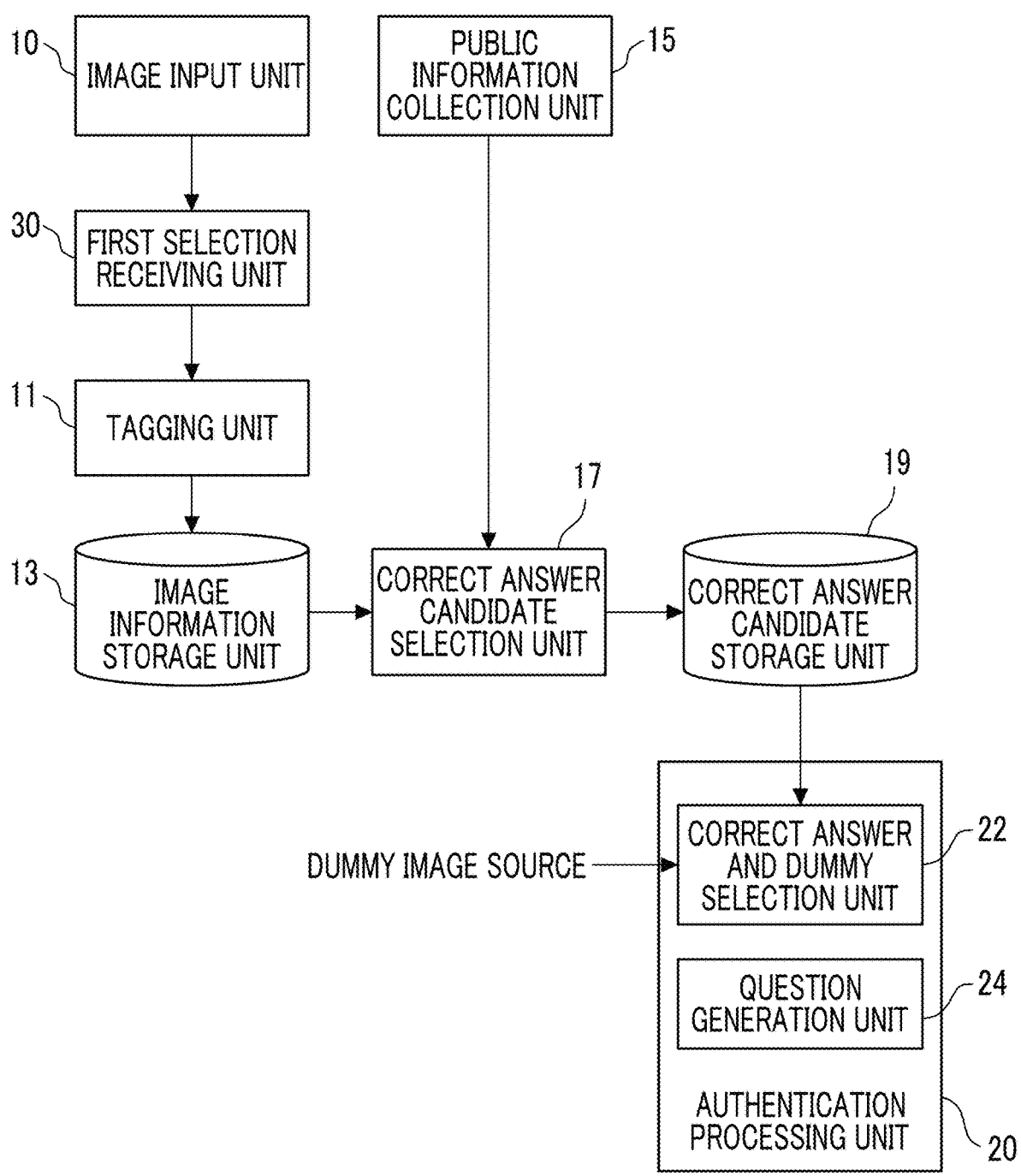
FIG. 5 is a diagram illustrating the functional configuration of an apparatus of a modification example.

FIG. 5 illustrates the functional configuration of the information processing apparatus in this modification example. In FIG. 5, the same functional elements as the functional elements of the information processing apparatus of the above-described exemplary embodiment shown in FIG. 1 are denoted by the same reference numerals, and the description thereof will be omitted.

In the configuration shown in FIG. 5, a first selection receiving unit 30 receives a first selection from the user with respect to images input from the image input unit 10. The first selection is performed by the user in order to narrow down the range of images that may be correct answer images for the image authentication among the images input from the image input unit 10. That is, in this modification example, there is a possibility that only the image selected by the user in the first selection among the images input from the image input unit 10 will be a correct answer candidate, and images not selected by the first selection are set as correct answer candidates. The first selection receiving unit 30 is provided in a case where the input of an image, of which use for image authentication is not necessarily intended by the user, is received, such as in a case where the image input unit 10 is a camera attached to the information processing apparatus (for example, a smartphone). Conversely, in a case where the information processing apparatus is a server that provides information processing services to a plurality of users, the first selection receiving unit 30 is not necessary since the images that the image input unit 10 receives from the users are images uploaded by the users for use in image authentication. However, the first selection receiving unit 30 may also be provided in such a server. In addition, an image that is not first selected is just an image that cannot be a correct answer candidate, and the image data itself may be stored in the information processing apparatus.

The tagging unit 11 tags the image selected by the user using the first selection receiving unit 30 and stores the information of the tag in the image information storage unit 13 so as to be associated with the ID of the image. An image excluded from the first selection by the user is not registered in the image information storage unit 13. The correct answer candidate selection unit 17 selects a correct answer candidate from the images stored in the image information storage unit 13.

The authentication processing unit 20 has a question generation unit 24. The question generation unit 24 generates a question, which is applicable to a correct answer image but is not applicable to a dummy image, based on the tags of a plurality of images (consisting of one or more correct answer images and one or more dummy images) selected by the correct answer and dummy selection unit 22. The authentication processing unit 20 presents the generated question to the user in association with the plurality of images selected by the correct answer and dummy selection unit 22. The user selects a correct answer image corresponding to the question from the plurality of presented images, thereby certifying the identity of the user.

Figure 6:
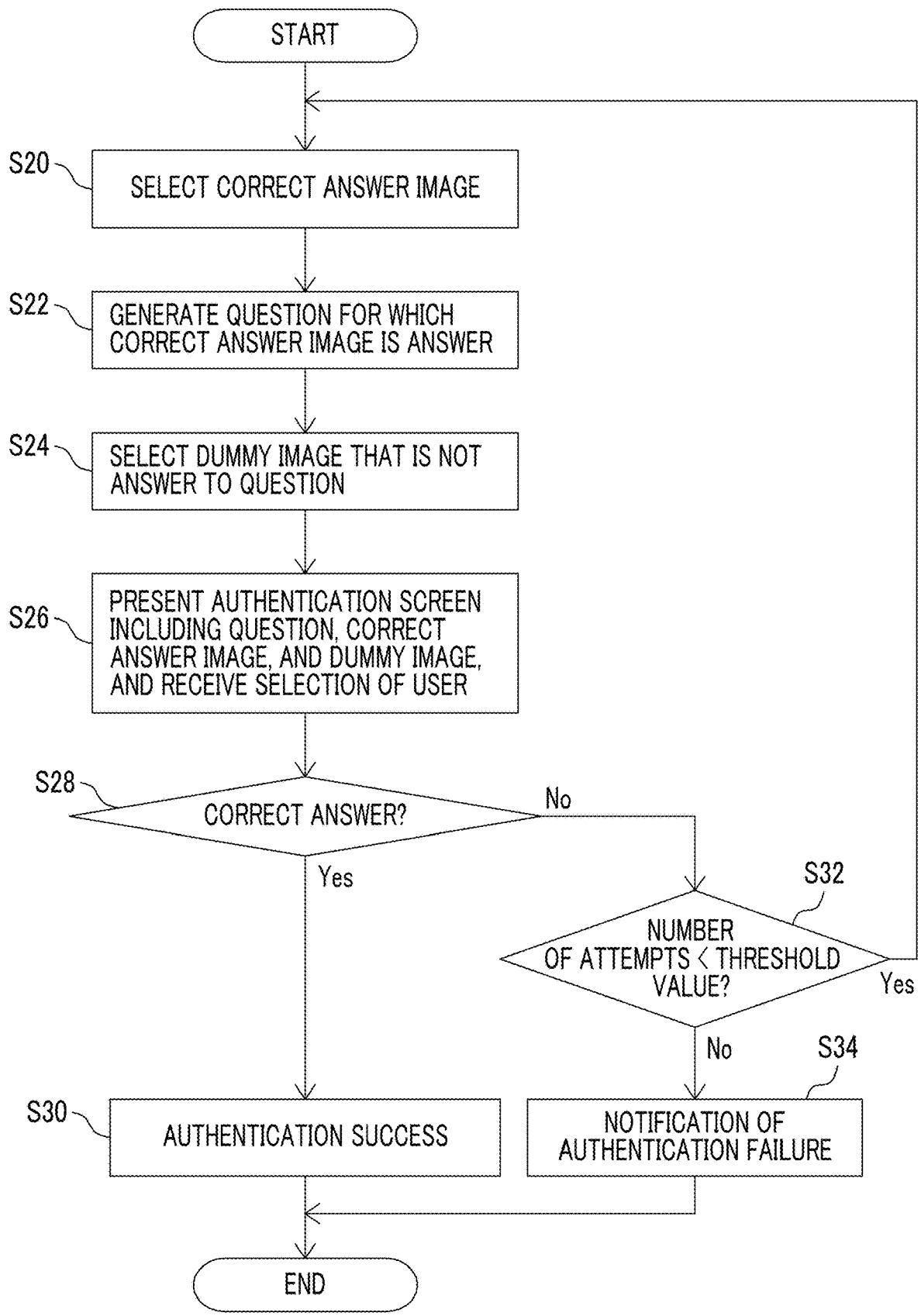
FIG. 6 is a diagram illustrating the processing procedure of an authentication processing unit.

FIG. 6 illustrates the processing procedure of the authentication processing unit 20. In this example, in the case of performing user authentication, first, the correct answer and dummy selection unit 22 selects one or more correct answer images to be used for the user authentication from the correct answer candidates in the correct answer candidate storage unit 19 (S20). The number of correct answer images to be selected is set in advance by the correct answer and dummy selection unit 22 or determined by the correct answer and dummy selection unit 22 according to the content (for example, how many correct answers are selected?) of a question to be generated.

Then, based on the tag information (which can be searched for from the image information storage unit 13 using the image ID of each correct answer image) of each of the selected correct answer images, the question generation unit 24 generates a question applicable to all the correct answer images using, for example, a known question generation technique (S22). In this question generation, for example, a common point of values for the identical tag item is found among all the selected correct answer images, and a question to select an image corresponding to a combination of common points for several tag items is generated. Here, in a case where all the values of tag items are the same among a plurality of images, the value itself is a common point. In a case where the value of a tag item is a date, the common point is found at several levels such as "day" level, "month" level, "season" level, and "year" level. In a case where the width of a common point is made too large, it is difficult for the user to recognize a common point between correct answer images. For example, even in a case where a plurality of selected correct answer images have a common point that the plurality of selected correct answer images are captured in 2001 to 2010, it can be thought that the common point at such a large time width level is difficult for the user to recognize. Therefore, it may be set in advance up to which level a common point is to be adopted for the question. For example, in a case where the values of tags indicating the genre of the image content in all the selected correct answer images are the same in a point of "food", the imaging date and time indicated by the imaging date and time tag is the same in a point of "August 2017", and the position information indicated by the GPS information tag is the same in a point of within the range of a tourist spot A, the question generation unit 24 generates a question "Please select an image of what you eat at the tourist spot A in August last year.".

The question generation unit 24 selects one or more tag items from tag items having similar values in all the correct answer images, and generates a question from a combination of the values (common value) of the one or more selected tag items. Which of the tag items having similar values is to be used for the question is randomly selected by the question generation unit 24, for example. The generation of a question from the values of one or more selected tag items may be performed by using a known method. For example, a question is generated by preparing a plurality of question templates including blank fields in which the values of several tag items can be embedded, selecting a question template matching a combination of one or more selected tag items, and embedding a common point of the values of the corresponding tag items to the blank field of the question template.

In a case where the question is generated, the correct answer and dummy selection unit 22 selects a predetermined number (that is, a number obtained by subtracting the number of correct answer images included in the total number of images presented to the user at the time of one authentication from the total number of images) of images not corresponding to the conditions indicated by the question, as dummy images, from the dummy image source (S24). Images in the dummy image source are tagged, and an image whose value of a tag item included as a question does not correspond to the conditions of the value of the tag item shown in the question, among the images in the dummy image source, is selected as a dummy image.

Even in the case of an image whose value of the tag item does not match the question, in a case where the image itself is too similar to one of the correct answer images, there is a concern that the user mistakenly selects the image as a correct answer image. Therefore, an image whose degree of image similarity with respect to one or more correct answer images is equal to or greater than a predetermined threshold value may be controlled not to be selected as a dummy image.

In a case where only an image with low commonality with a correct answer image is selected as a dummy image, persons other than the authorized user can easily select the correct answer image. Therefore, the correct answer and dummy selection unit 22 may select at least one image, which does not satisfy the conditions indicated by the question but has a certain degree of commonality with any correct answer image, as a dummy image. For example, an image whose values of one to several tag items adopted for the question are similar to values of the tag items of any correct answer image and values of the remaining tag items (including at least one tag item adopted for the question) are not similar to values of the tag items of the correct answer image is selected as a dummy image. In this case, for example, an image whose value of a tag indicating the genre of the image content is the same as that in the correct answer image and values of one or more tags among the other tags included in the question are different from those in the correct answer image is selected as a dummy image. The genre of the image content is a tag indicating the large classification of the image content among the tags of the image content, and is a higher concept of the value of a tag indicating the more specific image content. For example, in the example shown in FIG. 4, food and landscape are genres of the image content, and sea urchin bowl, mountain, and ramen are more detailed classifications. As a specific example, taking a case where a question "Please select an image of what you eat in Hakone in August last year" is generated as an example, an image which is an image of food but whose imaging date and time and place does not correspond to August of last year and Hakone is selected as a dummy image.

In the above, the flow of question generation or dummy image selection has been exemplified by taking the case where a plurality of correct answer images are selected by the correct answer and dummy selection unit 22 as an example. However, in a case where there is only one correct answer image, a simpler process may be performed. That is, in this case, the question generation unit 24 may generate a question corresponding to at least one of the tags of the correct answer image, and the correct answer and dummy selection unit 22 may select an image, in which at least one of the tags used for the question does not match the content indicated by the question, as a dummy image.

In the examples shown in FIGS. 5 and 6, the correct answer and dummy selection unit 22 may select a dummy image from the correct answer candidates in the correct answer candidate storage unit 19. That is, a correct answer candidate not corresponding to the question is selected as a dummy image. Since the correct answer candidate image in the correct answer candidate storage unit 19 is an image, for which it is unknown whether the image is not open to the public or the image is relevant to the user from the public information of the user, persons other than the authorized user cannot locate that the correct answer candidate image in the correct answer candidate storage unit 19 is "not present" in the images of the user. In a case where a dummy image is selected from images open to the public in a certain form, the attacker can determine that a probability that the image is a dummy image is high in a case where the attacker knows that the image shown on the authentication screen is an image open to the public. On the contrary, in a case where a dummy image is selected from correct answer candidates, it is difficult to make an attack in the method of making a determination as a dummy image since the image is an image open to the public.

The authentication processing unit 20 presents an authentication screen, on which selected correct answer images and dummy images and the generated question are shown, to the user, and receives the selection of a correct answer image from the user (S26). In a case where the terminal apparatus itself operated by the user is the information processing apparatus of the present exemplary embodiment, the authentication screen is displayed on the display device attached to the terminal apparatus. In a case where the information processing apparatus of the present exemplary embodiment is a server, the authentication processing unit 20 provides the authentication screen to the terminal apparatus operated by the user.

Figure 7:
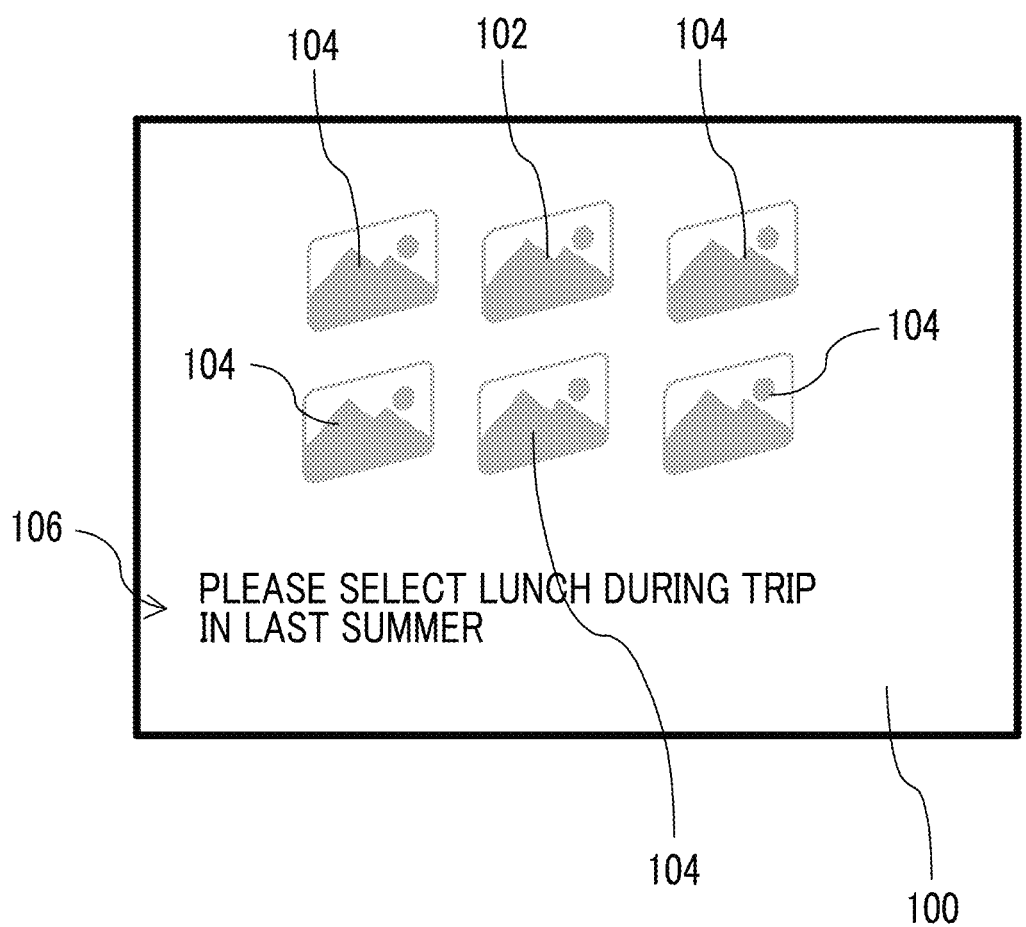
FIG. 7 is a diagram schematically showing a display example of an authentication screen.

FIG. 7 shows an example of an authentication screen 100. On the authentication screen 100, one correct answer image 102 and five dummy images 104 are displayed side by side, and a question 106 that is applicable to the correct answer image 102 but is not applicable to the five dummy images 104 is displayed.

On the authentication screen 100, the user performs an operation of selecting several images according to the content of the question. This operation is performed by, for example, a click operation using a mouse or the like or a touch operation on a touch panel screen.

The authentication processing unit 20 determines whether or not the selection of the user on the authentication screen 100 is a correct answer, that is, whether or not the conditions of the question are satisfied (S28). In a case where the determination result is a "correct answer", the authentication processing unit 20 sets the result of user authentication to "success" and permits the user to use the information processing apparatus (S30).

On the other hand, in a case where the selection of the user is an incorrect answer, that is, the conditions of the question are not satisfied, it is determined whether or not the number of attempts at image authentication by the user in the current authentication session (that is, the number of presentations of the authentication screen 100) has reached a predetermined threshold value (S32). In a case where the number of attempts has not reached the threshold value (determination result in S32 is Yes), the process returns to S20. That is, in this example, in a case where the selection of the user on the authentication screen 100 is an incorrect answer, the selection of a correct answer image is redone. In this case, at least one correct answer image different from the correct answer images presented on the previous authentication screen 100 (or a predetermined number of authentication screens 100 in the past) is included in correct answer images to be newly selected. At this time, none of the correct answer images shown on the previous authentication screen 100 may be selected, and a combination of completely new correct answer images may be selected. Thereafter, the authentication processing unit 20 generates a question matching the selected correct answer image group (S22), and selects a required number of dummy images that do not correspond to the conditions indicated by the question (S24). In dummy images to be selected at this time, at least one dummy image that is not included in the dummy images presented on the previous authentication screen 100 is included. Alternatively, no dummy image presented on the previous authentication screen 100 may be included in the dummy images to be selected this time. Then, the new authentication screen 100 on which the correct answer images, the dummy images, and the question are shown is presented to the user to make a request for selection again.

By repeating S20 to S28 and S32, in a case where the number of attempts has reached the threshold value in S32 (determination result in S32 is No), the authentication processing unit 20 determines that the authentication has failed (S34). In this case, the authentication processing unit 20 does not permit the user to use the information processing apparatus. At this time, since the user may be a malicious third party attempting to break the authentication of the originally authorized user, the authentication processing unit 20 may transition the information processing apparatus to the lock state so that the user cannot repeat further authentication attempts. For example, in a case where the information processing apparatus is a mobile terminal, the lock state continues for a predetermined time, during which the authentication processing unit 20 does not receive any operation for user authentication. In a case where the information processing apparatus is a server, the authentication processing unit 20 sets the user account that fails in authentication to the lock state and does not receive any operation for user authentication using the account for a predetermined time. In a case where the user attempts image authentication again and the authentication fails again after a predetermined time has passed from the transitioning to the lock state and the lock state is released, the authentication processing unit 20 may set the authentication in a lock state for a longer time than the previous time. In this manner, attacks of those who aim for illegal use become difficult.

In addition, in a method requiring that an unlocking operation set in advance by the authorized user should be correctly performed to release the lock state, the lock state is not released until the unlocking operation is correctly performed.

Although not shown in FIG. 7, a confirm button for confirming the selection of one or more images performed by the user may be provided on the authentication screen 100, and the selection state of an image once selected by the user may be able to be released, for example, by performing an operation of clicking or touching again, until the user presses the confirm button. That is, in the example in which the confirm button is provided, each image on the authentication screen 100 is in a non-selection state at the point in time at which the authentication screen 100 is displayed first, and is changed to the selection state in a case where the user performs a selection operation such as touching. In a case where the user performs a release operation (for example, touch or click) on the image in the selection state, the image is changed to the non-selection state. Then, all the images in the selection state at the point in time at which the user presses the confirm button become a determination material for user authentication as images selected by the user. The authentication processing unit 20 determines whether or not all the images selected by the user satisfy the conditions indicated by the question. For example, in a case where the question is to select all images (correct answer images) satisfying certain conditions, the authentication processing unit 20 sets the user authentication to be successful in a case where all of the images selected by the user satisfy the conditions of the question (that is, all of the images selected by the user are correct answer images) and any image not selected by the user does not satisfy the conditions of the question.

In a case where there is only one correct answer image displayed on the authentication screen 100, the confirm button may not be provided, and simply, the authentication may be determined to be successful in a case where the image selected by the user is a correct answer image (S30) and the process proceeds to S32 otherwise.

In the procedure of FIG. 6, in a case where the image group selected by the user on the authentication screen 100 is not a correct answer (determination result in S28 is No), the correct answer image, the question, and the dummy image are renewed. However, instead of this, for example, the question may be maintained. In this case, the correct answer and dummy selection unit 22 may select a set of new correct answer images satisfying the maintained question and a set of new dummy images not satisfying the maintained question.

In a case where the process returns to S20 after S32 and the new authentication screen 100 including a new correct answer image is presented to the user, the authentication processing unit 20 may increase the number of images displayed on the new authentication screen 100 to be greater than the number of images on the previous authentication screen 100. At this time, only the number of dummy images may be increased, or only the number of correct answer images may be increased, or both the numbers may be increased.

In the procedure of FIG. 6, the correct answer and dummy selection unit 22 selects correct answer images, and then the question generation unit 24 generates a question that all the selected correct answer images satisfy. However, this order is merely an example. The question generation unit 24 may generate a question first, and then the correct answer and dummy selection unit 22 may select correct answer images satisfying the generated question and dummy images not satisfying the generated question.

In the image authentication exemplified above, in a case where the number of correct answer images ("images owned by the user" as the population) is not sufficiently large, the frequency at which the same correct answer images are displayed on the authentication screen 100 increases and accordingly the strength of security becomes weak. Therefore, in a case where the number of correct answer candidate images in the correct answer candidate storage unit 19 is smaller than a predetermined threshold value, the authentication processing unit 20 may not be able to select image authentication as a user authentication method.

For example, it is assumed that a selection screen 200 based on the authentication method provided by the authentication processing unit 20 is illustrated in FIG. 8. As the authentication method, the authentication processing unit 20 supports methods of password authentication, fingerprint authentication, and face authentication in addition to the above-described image authentication. On the selection screen 200, buttons 202, 204, 206, and 208 corresponding to these four methods are shown. The user selects a method desired by the user from the four buttons 202 to 208.

In a case where the user selects image authentication on the selection screen 200, the authentication processing unit 20 checks whether or not the number of correct answer candidate images in the correct answer candidate storage unit 19 is equal to or greater than a predetermined threshold value and uses the image authentication as a method of subsequent user authentication in a case where the number of correct answer candidate images in the correct answer candidate storage unit 19 is equal to or greater than the threshold value. On the other hand, in a case where the number of correct answer candidate images in the correct answer candidate storage unit is less than the threshold value, the authentication processing unit 20 presents a guidance screen 210 to the user in this example. A message 212 indicating that image authentication cannot be used and a message 214 indicating a solution to the situation in which image authentication is not possible are displayed on the guidance screen 210. The message 214 includes a sentence prompting the user to return to the selection screen 200 and select another authentication method, a sentence prompting the user to perform an operation required to use image authentication in a case where the user desires to use image authentication, and a sentence prompting the user to capture different images with a camera, for example. The last sentence may include a numerical value indicating the approximate number of photographs to be taken. The example shown in FIG. 8 is an example of the case where the information processing apparatus of the present exemplary embodiment is a mobile terminal.

In the case of selecting another authentication method, the user presses a return button 216 to return to the selection screen 200, and selects a button of a desired authentication method. In a case where the user desires to use image authentication, the user presses a camera button 218. Then, the OS of the mobile terminal (information processing apparatus) activates the camera function. In a case where a photograph image is captured by the camera (image input unit 10), the image is tagged, and the correct answer candidate selection unit 17 determines whether or not to set the image to a correct answer candidate.

In a case where the number of correct answer candidates in the correct answer candidate storage unit 19 is less than the threshold value, the image authentication may not be displayed as an option on the selection screen 200. In this case, the image authentication may be displayed as an option that cannot be selected.

In the example in which the information processing apparatus supports a plurality of authentication methods, the threshold value (threshold value possible in S32) of the number of consecutive failures of image authentication for transitioning the information processing apparatus to the lock state is set to a threshold value lower than the similar threshold value in authentication methods other than the image authentication. For example, transitioning to the lock state occurs due to five consecutive mistakes in the password authentication, whereas transitioning to the lock state occurs due to three consecutive mistakes in the image authentication. In the case of image authentication for which a correct answer image is selected, the number of images that can be displayed on the authentication screen is limited, and some correct answer images have only to be selected. Therefore, a probability that authentication will succeed by chance is higher than that in the case of password authentication (for which about 10 digits of 26 letters of alphabet and 10 numeric numbers are combined). Therefore, in order to make attacks aiming for a lucky hit difficult, the threshold value of the number of attempts for transitioning to the lock state in the image authentication is set to be lower than that in other methods, such as password authentication.

In the mechanism of the present exemplary embodiment, due to the information disclosure action of the user after a certain image is selected as a correct answer candidate by the correct answer candidate selection unit 17 and registered in the correct answer candidate storage unit 19, the correct answer candidate may become ineligible. For example, there is a case where the user opens the correct answer candidate itself by SNS or a case where the user frequently posts a topic of a new taste relevant to the correct answer candidate. The correct answer candidate that becomes ineligible as described above needs to be excluded from being a correct answer candidate (deleted from the correct answer candidate storage unit 19). For this reason, for example, the correct answer candidate selection unit 17 operates the public information collection unit 15 periodically to collect public information, checks whether or not each correct answer candidate in the correct answer candidate storage unit 19 satisfies the conditions as a correct answer candidate, and deletes a correct answer candidate not satisfying the conditions any more from the correct answer candidate storage unit 19. This check may be the same as in the case of selecting a correct answer candidate from each image in the image information storage unit 13.

The information processing apparatus exemplified above is realized, for example, by causing a computer to execute a program representing each of the functions described above. Here, for example, the computer has a circuit configuration in which, as hardware, a microprocessor such as a CPU, a memory (main memory) such as a random access memory (RAM) and a read only memory (ROM), a controller for controlling a fixed storage device such as a flash memory, a solid state drive (SSD), and a hard disk drive (HDD), a network interface for performing control for connection with a network, such as various input/output (I/O) interfaces and a local area network, and the like are connected to each other through a bus or the like. A program in which the processing content of each of these functions is recorded is stored in a fixed storage device, such as a flash memory, through a network or the like and installed on the computer. The program stored in a fixed storage device is read into the RAM and executed by the microprocessor, such as a CPU, to realize the functional module group exemplified above.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
   a screen that displays a plurality of images consisting of one or more correct answer images selected from a candidate set, which consists of images not including images corresponding to public information of a user in an image group owned by the user, and one or more incorrect answer images other than the one or more correct answer images; and
   a processor that performs authentication of the user by having the user select at least one or more of the correct answer images from the plurality of displayed images,
   wherein the processor is configured to:
      collect public images open to public by the user; and
      generate, as the candidate set, a set of images not including images matching the public images collected by the processor and images, of which degrees of image similarity with respect to the public images are equal to or greater than a threshold value, in the image group owned by the user.

2. The information processing apparatus according to claim 1, wherein the processor is configured to:
   collect public information open to public by the user; and
   generate the candidate set not including images, which correspond to the public information collected from the image group owned by the user by the processor, in the image group owned by the user.

3. The information processing apparatus according to claim 2,
   wherein the processor collects information that has a possibility of having been viewed by many unspecified persons, among pieces of information transmitted to outside of the information processing apparatus through a network, as the public information.

4. The information processing apparatus according to claim 2,
   wherein the processor collects information posted by the user on a social networking service (SNS) as the public information.

5. The information processing apparatus according to claim 4,
   wherein, even in a case of information posted by the user on the SNS, the processor does not collect the information as the public information in a case where a disclosure range set for the information is narrower than a predetermined reference range.

6. The information processing apparatus according to claim 1, wherein the processor is configured to:
   specify a field of interest of the user from the public information; and
   generate the candidate set not including images, which correspond to the field of interest, in the image group owned by the user.

7. The information processing apparatus according to claim 1,
   wherein the processor collects images, which are transmitted to outside of the information processing apparatus by the user and satisfy a predetermined disclosure criterion, in the image group owned by the user as the public images.

8. The information processing apparatus according to claim 7,
   wherein the disclosure criterion is posting of an image on an SNS.

9. The information processing apparatus according to claim 8,
wherein, even in a case of an image posted by the user on the SNS, in a case where a disclosure range set for the image is narrower than a predetermined reference range, the processor does not collect the image as the public image.

10. The information processing apparatus according to claim 7,
wherein a case where the image is an image transmitted to outside of the information processing apparatus by e-mail, the disclosure criterion is that the number of destinations of the e-mail including the image is equal to or greater than a threshold value.

11. The information processing apparatus according to claim 7,
wherein, in a case where the image is an image transmitted to outside of the information processing apparatus by e-mail, the disclosure criterion is that destinations of the e-mail including the image include destinations other than destinations within a confidentiality range registered in advance in association with the user.

12. The information processing apparatus according to claim 1,
wherein the screen displays images, which are selected from a group of remaining images excluding the correct answer images in the candidate set, as the incorrect answer images.

13. The information processing apparatus according to claim 1, wherein the processor is configured to:
generate, from attribute information of each image included in the plurality of images, an authentication question that is applicable to the attribute information of the correct answer images but is not applicable to the attribute information of the incorrect answer images,
wherein the screen displays the generated authentication question so as to be associated with the plurality of images.

14. The information processing apparatus according to claim 13,
wherein the attribute information of the image includes at least one of metadata included in a file of the image, recognition result information indicating a content of the image obtained by image recognition processing on the image, or information detected by software in the information processing apparatus at a point in time at which the image is captured.

15. The information processing apparatus according to claim 1,
wherein the screen does not select images, of which degrees of image similarity with respect to the one or more correct answer images are equal to or greater than a predetermined threshold value, as the incorrect answer images.

16. The information processing apparatus according to claim 1, wherein the processor is configured to:
present a guidance screen, which shows that authentication by the processor is not available, to the user in a case where the number of images included in the candidate set is less than a threshold value.

17. The information processing apparatus according to claim 16,
wherein information prompting acquisition of a new image is further displayed on the guidance screen.

18. The information processing apparatus according to claim 1, wherein the processor is configured to:
perform control to replace the correct answer images and the incorrect answer images included in the plurality of images with a combination of different correct answer images and different incorrect answer images and display the combination of different correct answer images and different incorrect answer images on the screen in a case where the authentication by the processor fails and the user is made to retry the authentication.

19. The information processing apparatus according to claim 16, wherein the processor is configured to:
perform authentication using information other than images,
wherein in a case where an instruction to select a processor used for authentication of the information processing apparatus is given from the user, the processor displays a screen, which includes the processor as an option and on which the processor is not selectable, as the guidance screen.

20. The information processing apparatus according to claim 18,
wherein the number of images of the plurality of images to be displayed on the screen by the processor is larger than the number of images of the plurality of images displayed on the screen in a previous trial of authentication.

21. The information processing apparatus according to claim 18,
wherein the processor causes the information processing apparatus to transition to a lock state for the user in a case where the number of consecutive failures of the authentication reaches a threshold value, and
the threshold value of the number of consecutive failures is a lower value than a threshold value of the number of consecutive failures in a case where the information processing apparatus is transitioned to the lock state in a case where authentication by the processor, which is provided in the information processing apparatus and performs authentication using information other than images, fails consecutively.

22. A non-transitory computer readable medium storing a program causing a computer to function as:
a screen that displays a plurality of images consisting of one or more correct answer images selected from a candidate set, which consists of images not including images corresponding to public information of a user in an image group owned by the user, and one or more incorrect answer images other than the one or more correct answer images; and
a processor that performs authentication of the user by having the user select at least one or more of the correct answer images from the plurality of displayed images,
wherein the processor is configured to:
collect public images open to public by the user; and
generate, as the candidate set, a set of images not including images matching the public images collected by the processor and images, of which degrees of image similarity with respect to the public images are equal to or greater than a threshold value, in the image group owned by the user.

23. An information processing system, comprising:
an information processing apparatus; and
a server,
wherein the information processing apparatus includes
a screen that displays a plurality of images consisting of one or more correct answer images selected from a candidate set, which consists of images not including images corresponding to public information of a user in an image group owned by the user, and one or more incorrect answer images other than the one or more correct answer images, and a processor that performs authentication of the user by having the user select at least one or more of the correct answer images from the plurality of displayed images, and the server includes another processor configured to:

collect public information open to public by the user;

generate the candidate set not including images, which correspond to the public information collected from the image group owned by the user by the another processor, in the image group owned by the user;

collect public images open to public by the user; and generate, as the candidate set, a set of images not including images matching the public images collected by the processor and images, of which degrees of image similarity with respect to the public images are equal to or greater than a threshold value, in the image group owned by the user.

* * * * *